US011629054B2

United States Patent
Dushatinski et al.

(10) Patent No.: US 11,629,054 B2
(45) Date of Patent: Apr. 18, 2023

(54) BORON NITRIDE NANOTUBE PURIFICATION

(71) Applicant: BNNT, LLC, Newport News, VA (US)

(72) Inventors: Thomas G. Dushatinski, Chesapeake, VA (US); Kevin C. Jordan, Newport News, VA (US); Michael W. Smith, Newport News, VA (US); R. Roy Whitney, Newport News, VA (US); Jonathan C. Stevens, Williamsburg, VA (US)

(73) Assignee: BNNT, LLC, Newport News, VA (US)

( * ) Notice: Subject to any disclaimer, the term of this patent is extended or adjusted under 35 U.S.C. 154(b) by 1010 days.

(21) Appl. No.: 16/349,483

(22) PCT Filed: Nov. 29, 2017

(86) PCT No.: PCT/US2017/063729
§ 371 (c)(1),
(2) Date: May 13, 2019

(87) PCT Pub. No.: WO2018/102423
PCT Pub. Date: Jun. 7, 2018

(65) Prior Publication Data
US 2019/0292052 A1 Sep. 26, 2019

Related U.S. Application Data

(60) Provisional application No. 62/427,506, filed on Nov. 29, 2016.

(51) Int. Cl.
*H01M 4/02* (2006.01)
*C01B 21/064* (2006.01)
(Continued)

(52) U.S. Cl.
CPC .......... *C01B 21/0648* (2013.01); *C01B 35/08* (2013.01); *C01B 35/146* (2013.01);
(Continued)

(58) Field of Classification Search
CPC ....................................................... H01M 4/02
See application file for complete search history.

(56) References Cited

U.S. PATENT DOCUMENTS 6,967,011 B1    11/2005  Saboungi et al.
8,734,748 B1     5/2014  Hung et al.
(Continued)

FOREIGN PATENT DOCUMENTS

CA   2 877 060      10/2014
JP     5059589      10/2012
WO   2014/199200   12/2014

OTHER PUBLICATIONS

International Search Report for PCT/US2017/063729 dated Feb. 12, 2018, 2 pages.
(Continued)

*Primary Examiner* — Jacob B Marks
(74) *Attorney, Agent, or Firm* — Joshua B. Brady; Nixon & Vanderhye, P.C.

(57) ABSTRACT

Disclosed herein are processes for purifying as-synthesized boron nitride nanotube (BNNT) material to remove impurities of boron, amorphous boron nitride (a-BN), hexagonal boron nitride (h-BN) nanocages, h-BN nanosheets, and carbon-containing compounds. The processes include heating the BNNT materials at different temperatures in the presence of inert gas and a hydrogen feedstock or in the presence of oxygen.

20 Claims, 11 Drawing Sheets

(51) Int. Cl.
    *C04B 35/583*     (2006.01)
    *C01B 35/08*     (2006.01)
    *C01B 35/14*     (2006.01)
    *B82Y 30/00*     (2011.01)
    *B82Y 40/00*     (2011.01)

(52) U.S. Cl.
    CPC ............ *C04B 35/583* (2013.01); *B82Y 30/00* (2013.01); *B82Y 40/00* (2013.01); *C01P 2004/01* (2013.01); *C01P 2004/03* (2013.01); *C01P 2004/04* (2013.01); *C01P 2004/13* (2013.01)

(56) References Cited

U.S. PATENT DOCUMENTS

| | | |
|---|---|---|
| 2006/0239891 A1 | 10/2006 | Niu et al. |
| 2008/0069758 A1 | 3/2008 | Campbell |
| 2010/0074832 A1 | 3/2010 | Dailly et al. |
| 2010/0192535 A1 | 8/2010 | Smith et al. |
| 2017/0253485 A2* | 9/2017 | Kim ........................ H04L 41/22 |

OTHER PUBLICATIONS

Written Opinion of the ISA for PCT/US2017/063729 dated Feb. 12, 2018, 8 pages.

International Preliminary Report on Patentability for PCT/US2017/063729 dated Mar. 1, 2019, 12 pages.

J-L. Cochon, et al. "A Continuous Wave CO2 Laser Reactor for Nanotube Synthesis", AIP Conference Proceedings 486, Jan. 1, 1999, pp. 237-240.

Maser, W. K. et al., "Production of Carbon Nanotubes: the light approach", Carbon, Elsevier, Oxford, GB, vol. 40, No. 10, Aug. 1, 2002, pp. 1685-1695.

Maser, W. K. et al., "Production of High-Density Single-Walled Nanotube Material by a Simple Laser-Ablation Method", Chemical Physics Letters, vol. 292, No. 2, 2002, pp. 587-593.

Extended European Search report for EP 19184253.3 dated Nov. 22, 2019.

* cited by examiner

BORON NITRIDE NANOTUBE PURIFICATION

CROSS REFERENCE TO RELATED APPLICATIONS

This application is the U.S. national phase of International Application No. PCT/US2017/063729 filed Nov. 29, 2017 which designated the U.S. and claims priority to U.S. Provisional Patent Application No. 62/427,506 filed Nov. 29, 2016, the entire contents of each of which are hereby incorporated by reference.

STATEMENT REGARDING GOVERNMENT SUPPORT

None.

FIELD

The present disclosure relates to purifying as-synthesized boron nitride nanotube (BNNT) material to remove impurities, and more specifically impurities of boron, amorphous boron nitride (a-BN), hexagonal boron nitride (h-BN), and carbon-based compounds.

BACKGROUND

There are numerous applications of BNNTs. The unique properties of BNNTs may be diminished, somewhat, due to impurities in the as-synthesized BNNT material. BNNTs synthesized by a high temperature method or a high temperature high pressure method typically are high quality BNNTs, i.e. the number of walls range from one to ten (with most being two-walled and three-walled), the length-to-diameter ratios are typically ten thousand to one or higher, the BNNTs are catalyst free, and the BNNTs are highly crystalline with very few defects (less than one defect per one hundred diameters of length). However, small particles of boron, a-BN and h-BN (including h-BN nanocages and h-BN nanosheets) may be present. These small particles are typically tens of nanometers (nm) in scale, but may be smaller or larger depending on the manufacturing process. Depending on synthesis conditions, these small particles may account for 5-95 percent of the mass of the as-synthesized material (some synthesis conditions may result in impurities that exceed this range). These impurities have several disadvantages, including interfering with the dispersion of the BNNT material in dispersants, reduced BNNT surface area, reduced strength, reduced interfacial interactions in composites, and interfering with the BN chemistry in the case of boron particles. Other BNNT synthesis methods are known, but they generate as-synthesized BNNT material suffering from considerable impurities.

Few contemporary methods are available for BNNT purification of the as-synthesized BNNT material, and the available methods have significant disadvantages. The available methods often remove only one type of impurity (e.g. boron particles), and/or the methods damage and/or remove much of the BNNTs themselves, resulting in final BNNT yields below 10 percent. Some purification methods disperse the as-synthesized BNNT through sonication, sacrificing the high aspect ratio of as-synthesized BNNT material, followed by centrifuging. These methods also may produce less than 10 percent yields of purified BNNT in the supernate. Such yields make large-volume manufacturing highly inefficient.

Accordingly, there exists a need for purifying as-synthesized BNNT material that remove impurities without adversely affecting BNNTs.

SUMMARY

As disclosed herein, impurities of boron particles, amorphous boron nitride (a-BN), hexagonal boron nitride (h-BN) nanocages, h-BN nanosheets, and carbon-based compounds may be removed from as-synthesized BNNTs, without damaging the BNNTs. The purification process may be performed in stages, each stage designed to remove a target impurity. Depending on the as-synthesized BNNT material, one or more stages may not be necessary in some embodiments. Similarly, stages may be performed in orders other than as disclosed herein, depending on the particular as-synthesized BNNT material and the relative amounts of impurities.

In some embodiments, the process for purifying the BNNT material includes (1) heating the BNNT material to a first temperature and for a first duration, in the presence of an inert gas and a hydrogen feedstock to remove boron impurities; (2) heating the BNNT material at a second temperature for a second duration, to remove boron nitride impurities; and (3) heating the BNNT material at a third temperature for a third duration, to remove boron oxide impurities. For removing boron impurities, the temperature may preferably be about 500-650° C., and the as-synthesized material may remain in a chamber at the temperature for a given time, preferably about 0.16-12 hours. In some embodiments, the inert gas may include nitrogen, or it may consist of nitrogen, or it may consist essentially of nitrogen. In some embodiments, the hydrogen feedstock may be at least one of water vapor and hydrogen gas. In some embodiments, the amount of water vapor in the nitrogen gas may be controlled by using a dry nitrogen gas and bringing the dry nitrogen gas to saturated water vapor conditions at a temperature of 30-100° C., for example. For removing boron nitride impurities, the temperature may be raised to a second temperature, preferably about 650-800° C., and the second duration is preferably about 0.16-12 hours. For removing boron oxide impurities, the temperature may be lowered to a third temperature, preferably about 500-650° C., and the third duration is preferably about 0.16-12 hours. It should be appreciated by those of ordinary skill in the art that the temperatures, durations, and hydrogen gas flow and pressure parameters may vary depending on the particular embodiment and for a given as-synthesized BNNT material. The operating parameters may be optimized for the particular embodiment and as-synthesized BNNT material, and may therefore deviate from the embodiments disclosed herein.

Carbon impurities may be present in some as-synthesized BNNT materials. In some embodiments, the process may include pre-baking the BNNT material to remove carbon impurities. The pre-baking temperature may be, preferably, about 400-500° C., and the pre-baking duration may be about 0.5-3 hours. In some embodiments, the pre-baking may occur in an environment comprising ozone.

In some embodiments, the process for purifying a BNNT material includes (1) heating the BNNT material to a first temperature for a first duration in an oxygen-rich environment to remove boron impurities; (2) heating the BNNT material at a second temperature for a second duration to remove boron nitride impurities; and (3) heating the BNNT material at a third temperature for a third duration to remove boron oxide impurities. In some embodiments, the BNNT material is heated in an environment having a pressure of 0.1-1.0 atmospheres. The first temperature may be, preferably, about 500-650° C., and the first duration may be, preferably, about 0.16-12 hours. The second temperature may be, preferably, about 650-800° C., and the second duration may be about 0.16-12 hours. The third temperature may be, preferably, about 500-650° C., and the third duration may be about 0.16-12 hours.

It should be appreciated by those of ordinary skill in the art that the temperatures, durations, and oxygen parameters may vary depending on the particular embodiment and for a given as-synthesized BNNT material. The operating parameters may be optimized for the particular embodiment and as-synthesized BNNT material, and may therefore deviate from the embodiments disclosed herein. Not all stages may be necessary in all embodiments, and stages may be performed in orders other than as disclosed in the embodiments described herein.

DETAILED DESCRIPTION

Described herein are stages that may be implemented in processes for purifying as-synthesized BNNTs. The stages may be performed in orders other than as shown herein, and some stages may be not needed for certain as-synthesized BNNT materials. Given the potential variation in as-synthesized BNNT materials, it should also be appreciated that some embodiments may employ various processing conditions outside the exemplar ranges disclosed herein without deviating from the present approach.

High quality BNNTs, such as those synthesized by a high temperature method, have few defects, no catalyst impurities, one to ten walls (with the peak in the distribution at two-walls), and a rapidly decreasing larger number of walls. The BNNTs' diameters typically range from 1.5-6 nm but may extend beyond this range. The BNNTs' lengths typically range from a few hundreds of nm to hundreds of microns but may extend beyond this range. BNNTs synthesized from a high temperature method typically make up about 50% of the bulk material and may have impurities of boron, a-BN, h-BN nanocages, and h-BN nanosheets. These impurities are typically a few tens of nm in size or less but may extend beyond this range, especially in the case of h-BN nanosheets. The production parameters of the high temperature method can be adjusted to have more or less boron impurity as compared to the a-BN, h-BN nanocages and h-BN nanosheets impurities. It should be appreciated that the apparatus and methods disclosed herein are not intended to be limited to a particular quality of BNNT materials, unless it is explicitly stated herein.

Figure 1:
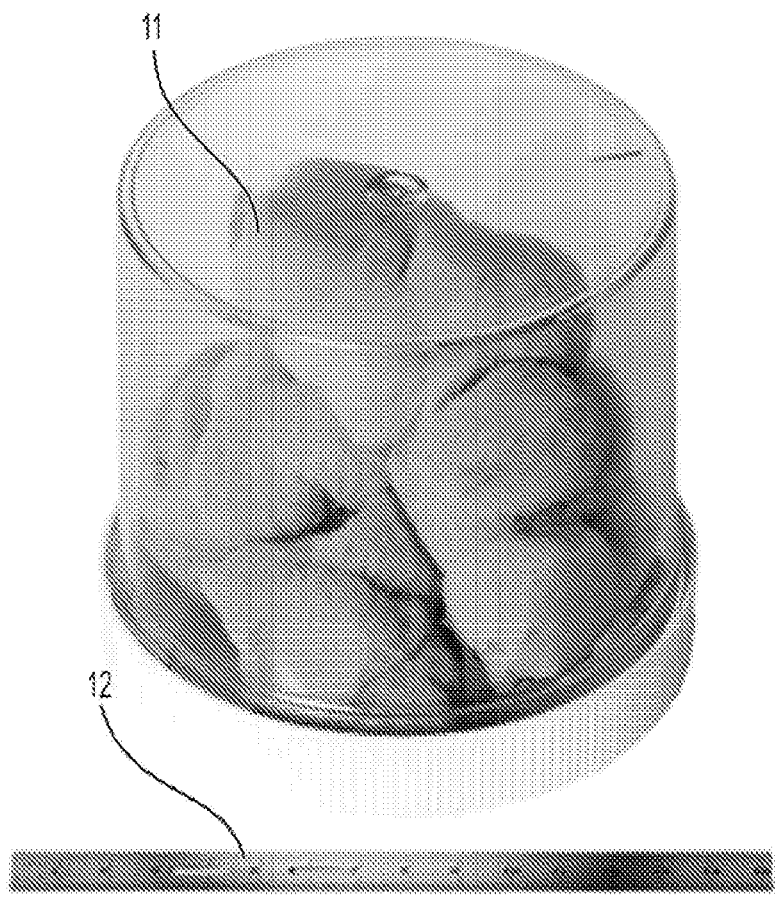
FIG. 1 shows as-synthesized BNNT material.

The density of the as-synthesized BNNT material from a high temperature method is typically roughly 0.5 grams per liter (0.5 g/L) but easily varies by 50% or more. This value of the "tap density" can be compared to the density 2,100 g/L for h-BN. FIG. 1 shows a photograph of BNNT material 11 synthesized using a high temperature method. The as-synthesized BNNT material 11 has the appearance of a "puff ball" or "cotton ball" as shown in FIG. 1, in which the BNNT material 11 is typically on the scale of centimeters to several tens of centimeters, as shown by ruler 12. In some embodiments, the as-synthesized BNNT material may be collected in arrangements that maintain the flow pattern of the BNNT material as it is harvested. The geometry of the collection may have no impact on the purification processes described herein. In some embodiments, the BNNT material 11 may easily be compacted.

Figure 2:
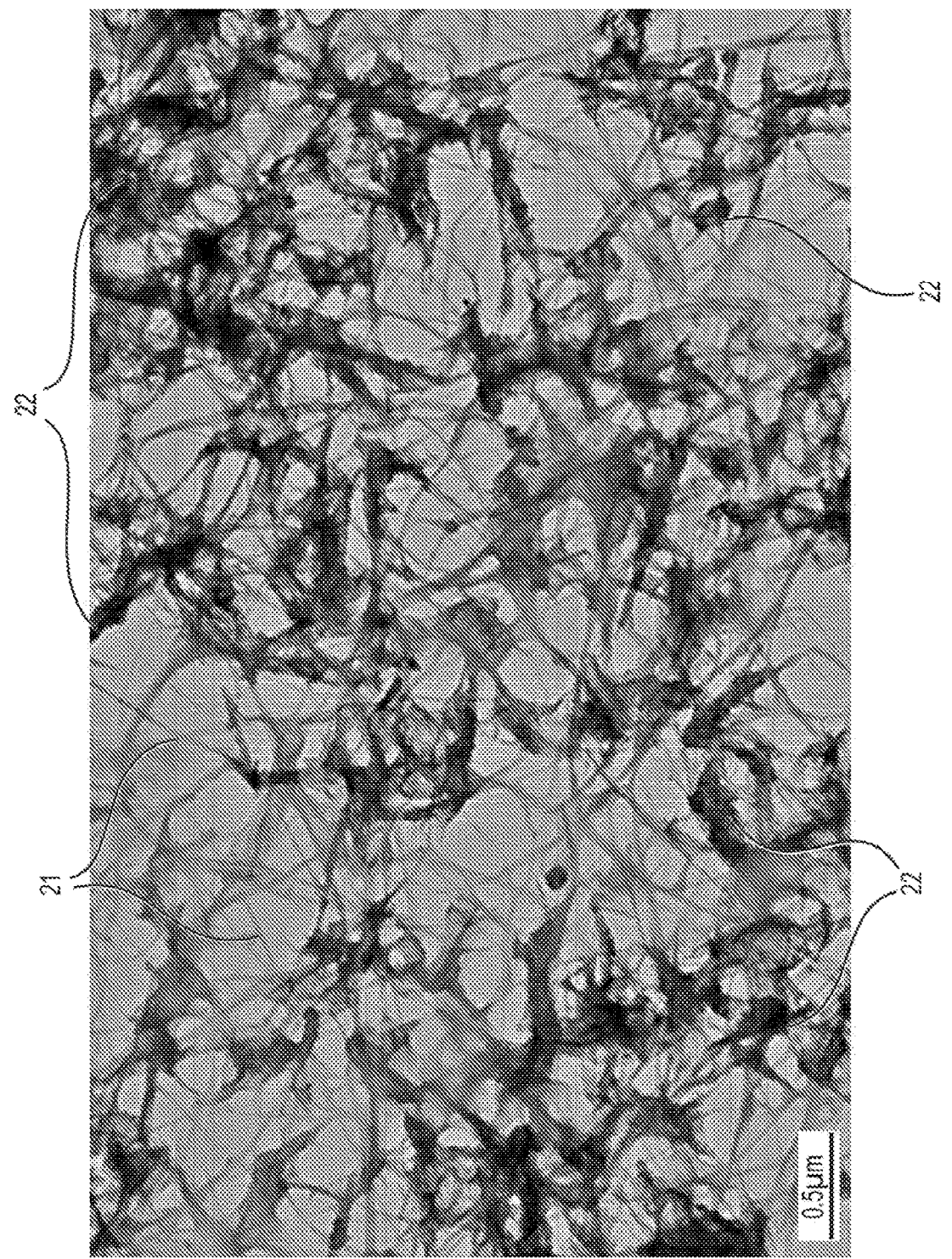
FIG. 2 illustrates a transmission electron microscope (TEM) image of as-synthesized BNNT material from a region of relatively high amount of h-BN nanosheets.
Figure 3:
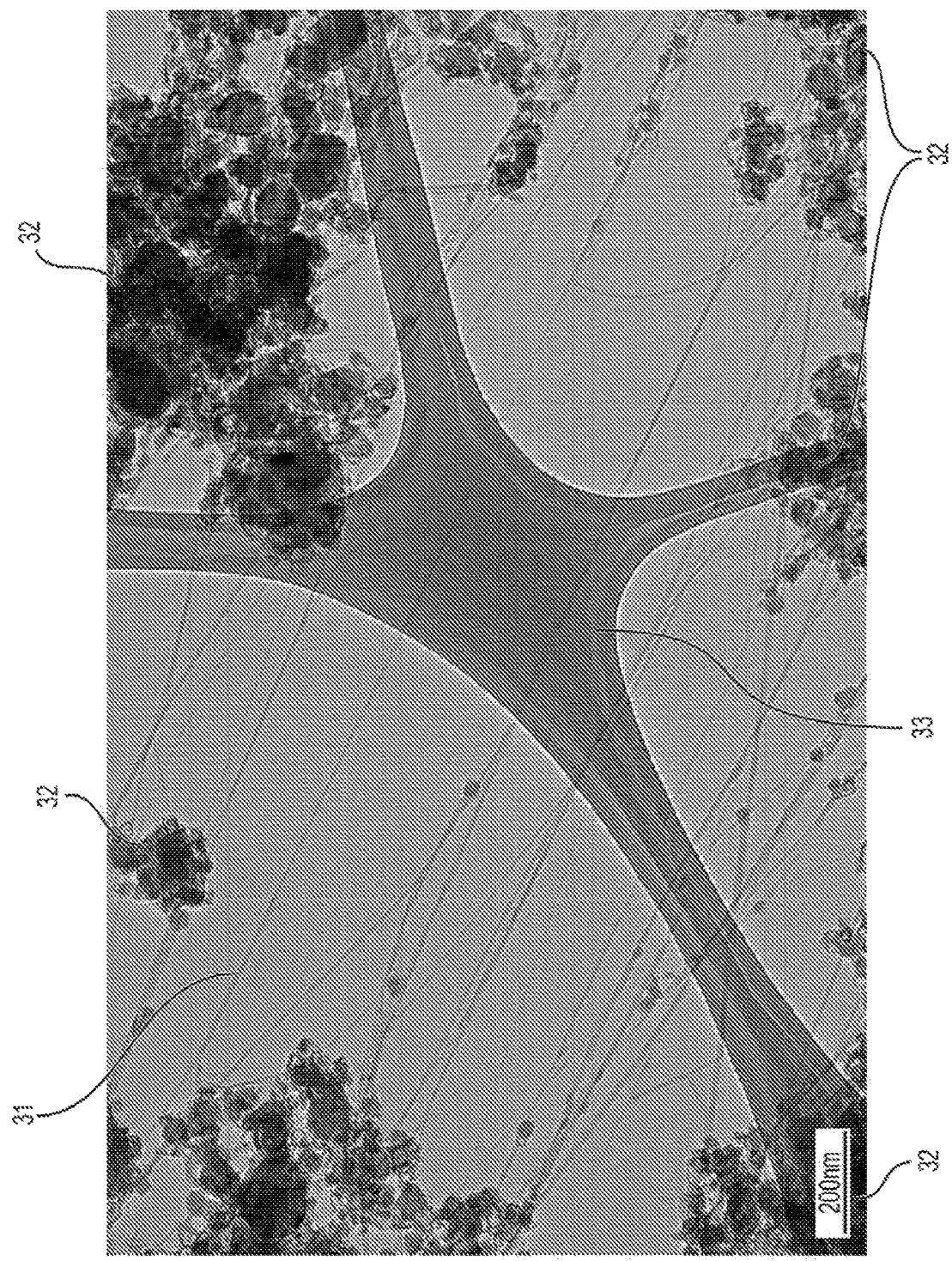
FIG. 3 illustrates a TEM image of as-synthesized BNNT material on a carbon lacy grid from a region of relatively high amount of h-BN nanocages.
Figure 4:
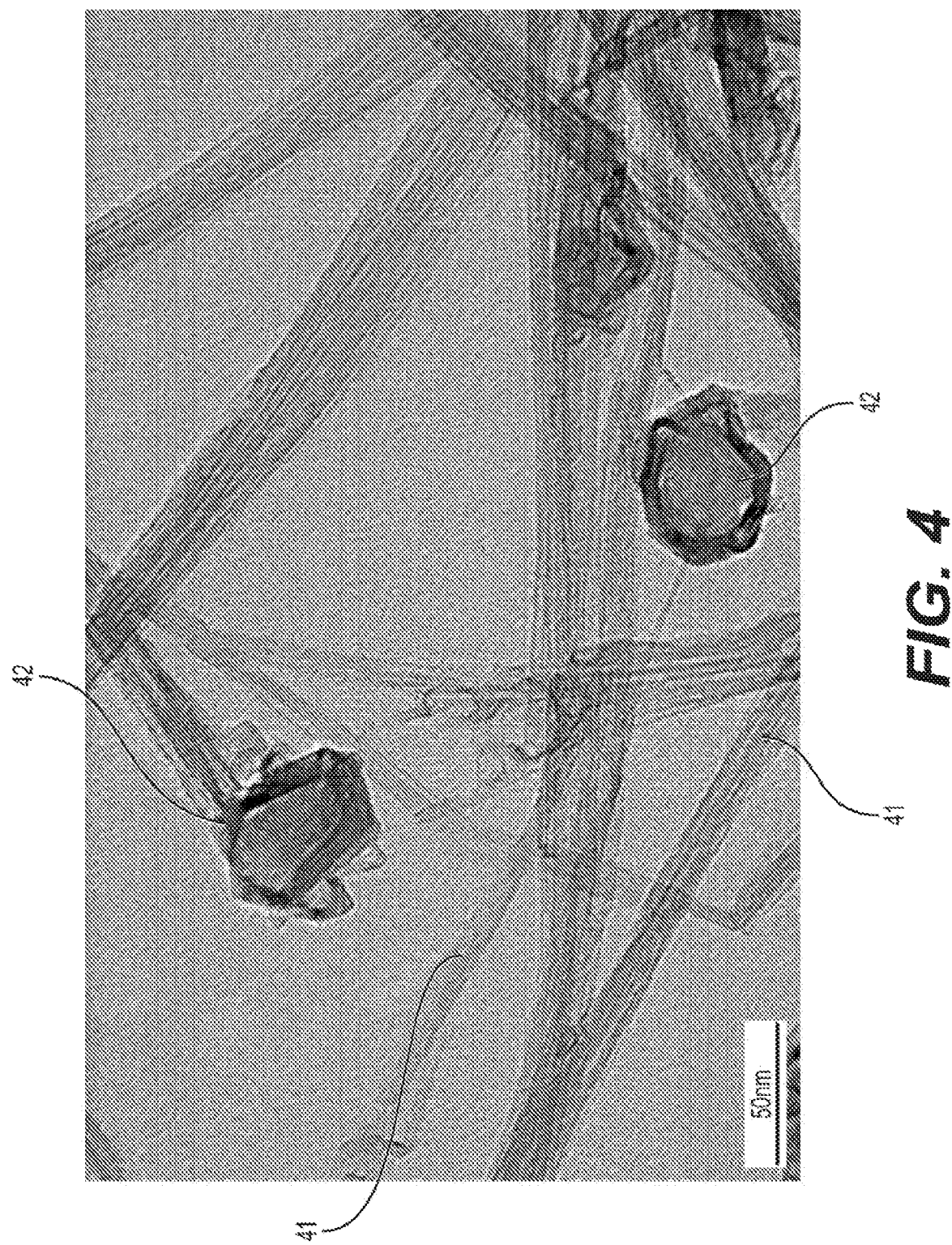
FIG. 4 illustrates a TEM image of h-BN nanocages with BNNTs.

TEM images of the as-synthesized BNNT material are shown in FIGS. 2 and 3. BNNTs 21 and BNNTs 31 form long fibers whereas impurities 22 and impurities 32 (which include boron, a-BN, h-BN nanocages and h-BN nanosheets) may be seen as clumps of material in the images. Lacy carbon grid 33 is present to support the as-synthesized BNNT material during the process to make the TEM images. FIG. 4 shows an expanded image of h-BN nanocages 42 amidst the BNNTs 41.

In tests, purification of BNNTs was shown to occur at about 200° C. and about 1800 psi, suggesting that the activation temperatures for evolving each contaminating boron and boron nitride species to borate to be volatized can be decreased at increased pressure without damaging BNNTs. However, operating at elevated temperatures and pressures is not preferred as safer atmospheric options are available. Through increases in temperature, pressure, and the concentration of reactive species, the purification of BNNTs can be attained stepwise, removing mostly one impurity species at each stage. For example, carbon requires the lowest energetics to remove, followed by boron, a-BN, h-BN nanosheets, h-BN nanocages, then tubular h-BN. b-BN nanosheets and h-BN nanocages may be removed at about the same time or at similar conditions in most embodiments, depending on the composition of the as-synthesized material. It should be appreciated that these stages may be performed in different orders, if desired for a particular embodiment.

In some embodiments, the purification process includes discrete stages by which impurities of a-BN, h-BN, including h-BN nanocages and h-BN nanosheets, and boron are removed from as-synthesized BNNT material. The stages may be performed sequentially and uninterrupted, such that the as-synthesized BNNT material remains in the same chamber during the entire purification process. In other embodiments, one or more stages may be performed separately, in different chambers or with intervening material handling or other processing. In some embodiments, an optional stage may include removing carbon and carbon-based compounds (e.g. hydrocarbons) from the as-synthesized BNNT material. This step is "optional" because the as-synthesized BNNT material may not have any carbon or carbon-based compounds. However, if, for example, the as-synthesized material has been processed using carbon-based compounds, such as sonication in a solution that contains a hydrocarbon, then the composition will have residual hydrocarbons present in the BNNT material. Other pre-purification handling may cause the as-synthesized BNNT material to include carbon (and/or other) impurities as well. In some embodiments, removal of carbon-based compounds may be at least partially achieved by heating the material containing the carbon-based compounds to a temperature above the boiling point of the carbon-based compound in air, dry nitrogen, and a vacuum. In some embodiments, the BNNT material is heated to a temperature greater than about 400° C., at which point carbon pyrolyzes in environments containing oxygen, evolving to carbon dioxide. However, heating above the boiling point of the carbon-based compounds may not remove carbon-based compounds attached to BNNTs or unbound to hydrogen. In some embodiments, the BNNT material containing carbon or carbon-based compounds is heated to about 450-500° C. In some embodiments, if only hydrocarbons are to be removed and boron and h-BN materials are not to be affected in a certain stage, then the BNNT material may be heated to 400-450° C. Depending on the amounts of carbon and/or hydrocarbons present, the BNNT material may be heated for about 30 minutes to 3 hours, though shorter or longer periods may be appropriate in some embodiments. Those of ordinary skill in the art will understand how to optimize the pre-baking time for a given embodiment and/or an as-synthesized BNNT material. In some embodiments, the BNNT material with carbon and/or hydrocarbons present may be placed in air with ozone present such as supplied by standard ozone generators used to clean air in a large room having an output of 300 mg/hr or above of ozone with a gas flow rate of 20-150 cfm. The ozone may oxidize the carbon and hydrocarbons present typically in 30 minutes to 3 hours, though shorter or longer periods may be appropriate in some embodiments.

In some embodiments, the purification process of as-synthesized BNNT material includes a stage for the removal of boron particles. Boron evolves to meta-stable states of borate ($BO_3$, $BO_4$, $B_2O_3$, etc.) at temperatures above 450° C. in the presence of an oxygen feedstock such as oxygen gas and water. The heating duration varies depending on the chamber, the BNNT material, and the embodiment, but generally may be about 0.12-12 hours. Borates may remain as solid residues on the BNNT sample after heating, without a hydrogen feedstock. Flowed gas through a furnace chamber containing a hydrogen feedstock such as water vapor, hydrogen gas, or a chemical that degrades to cation species and hydrogen gas will convert boron oxide compounds to ($B_xO_xH_x$) boric acid (hydrogen borate) as the sample is hydrogenated. The rate of sublimation of boric acid may be maximized as one of ordinary skill in the art should understand, as borate is the most hydrolyzed.

In some embodiments, boron particles may be removed by heating the BNNT material in an environment having nitrogen gas plus water vapor gas, preferably either without oxygen or with minimal oxygen. In some embodiments, the nitrogen gas and water vapor may be flowed through the as-synthesized BNNT material at a temperature of about 500° C. to about 650° C. The heating duration varies depending on the chamber, the BNNT material, and the embodiment, but generally may be about 0.12-12 hours. The oxygen in the water vapor is sufficient to convert the boron particles to boron oxide compounds, and subsequently to convert the boron oxide compounds to volatile boric acid. The flowing nitrogen gas and water vapor may then remove the boric acid from the BNNT material. In some embodiments, a temperature of about 550° C. is preferred. In some embodiments, purifying the as-synthesized BNNT material by controlled heating in a nitrogen gaseous environment that has no gaseous oxygen or a low amount of gaseous oxygen (i.e. from about 0.1-1 atmosphere) and a high level of water vapor (i.e. from about 30-90 percent as measured by relative mass). The nitrogen gas flow rate is typically 1-100 cfph per gram of BNNT material but may extend beyond this range. It should be appreciated by those of ordinary skill in the art that the nitrogen, water, and oxygen content and flow rate may be optimized for a given embodiment and/or a particular as-synthesized BNNT material.

In some embodiments, the amount of water vapor in the nitrogen gas may be controlled by initially filling the region with dry nitrogen gas and bringing it to saturated water vapor conditions at a temperature of about 30° C. to about 120° C., and then flowing the nitrogen gas-water vapor mixture into the higher temperature region. In some embodiments, the saturated vapor is initially heated to about 80-100° C. In some embodiments, the temperature of the nitrogen plus water vapor fed into the 500-650° C. environment is 120° C. to 200° C., and water is injected into the system such that the water vapor is above the saturation pressure in nitrogen for water vapor. In some embodiments, the time to remove the boron particles and the associated borates may be less than 10 minutes (particularly if the level of water vapor is relatively high, i.e. above 50 wt %) but may extend to 12 hours or longer, particularly at lower levels, i.e. below 20 wt % of water vapor. In some embodiments, the removal of the evolved borates without further oxidation of BN material may take time ranging from ten minutes under large volumes (e.g. about 100 cfph per gram of BNNT material at the upper range of the temperatures as indicated of wet gas flow) to hours under lower flow rates of moist gas (e.g. 1 to 10 cfph per gram of BNNT material at the lower range of the temperatures as indicated).

In some embodiments, and preferably once the boron particles have been removed, the temperature may be raised to about 650-800° C. to remove boron nitride compounds. Heating may convert the boron nitride compounds to various forms of boron oxide, boric acid, and nitrogen gas. In some embodiments, the temperature is raised to about 700° C. The heating duration varies depending on the chamber, the BNNT material, and the embodiment, but generally may be about 0.12-12 hours. In some embodiments, the BNNT material is heated for 1-12 hours, generally depending flow rates and levels of water vapor, among other variables. It should be appreciated by those of ordinary skill in the art that the process may be optimized for a given embodiment and/or a particular as-synthesized BNNT material.

Boron oxide that results may be converted to volatile boric acid during this stage, and may then be removed from the process by the flowing water vapor-laden nitrogen gas. With temperature and water vapor pressure optimized for a given BNNT material feedstock, a-BN may convert to boric acid first, and then the edges of the h-BN particles, including h-BN nanocages and h-BN nanosheets, convert to boric acid. BNNTs convert to boric acid last, and normally the processing parameters may be optimized to minimize BNNT loss during this stage. In particular, the heating duration, temperature, and water vapor content, may be varied to avoid or minimize BNNT loss. Also, many of the BNNTs terminate on particles of h-BN that include a-BN, h-BN nanosheets and h-BN nanocages. As the edges of the h-BN particles including h-BN nanosheets are converted, the whole h-BN particles then are slowly converted and the ends of the BNNTs begin converting to boric acid. It should be appreciated that one of ordinary skill in the art may adjust the conditions of time, temperature, and water vapor concentration to account for the conditions of the as-synthesized BNNT material. For example, one skilled in the art of matching chemical reactions to the conditions of the feedstock will appreciate that the preferred conditions for purifying the as-synthesized BNNT material shown in the TEM image of FIG. 2 with its relatively low amount of particle impurities 22 may be different from the preferred conditions for purifying the as-synthesized BNNT material shown in the TEM image of FIG. 3 with its high amount of particle impurities 32. Temperature changes as small as 10° C. may have significant effects on the yield of purified BNNTs from the process for a given condition of the feedstock of as-synthesized BNNT material.

In some embodiments, the process of purifying the as-synthesized BNNT material comprises a step of lowering the temperature to about 500-650° C. such that residual boron oxides are converted to boric acid and are volatized and removed without affecting the purified BNNTs. The time for this step may be as short as 10 minutes (0.16 hours) or extend to 1 hour, depending flow rates and levels of water vapor in the embodiments, among other factors. Overall, though, the heating duration varies depending on the chamber, the BNNT material, and the embodiment, but generally may be about 0.12-12 hours. In some embodiments, the temperature may be set to about 550° C. In some embodiments, the residual boron oxides are preferably removed in an oxygen-free environment, or low oxygen environment, i.e. oxygen below 1 wt % of the gas so as to not reintroduce boron oxides.

Conversely, in some embodiments, it may be desirable to introduce some oxygen gas into the process but typically not above that found in air. Doing so will change the times, temperatures, and water vapor pressures for optimal yields. The addition of oxygen gas in the presence of the high temperature water vapor will more aggressively attack the BNNTs such that less water vapor may be needed, though some water vapor or hydrogen gas is needed to convert the boron oxides to borates including boric acid. In some embodiments, the concentration and temperature of oxygen is carefully controlled such that it does not readily convert the BNNTs to boron oxide compounds ($BO_3$, $BO_4$, $B_2O_3$, etc.). In some embodiments, the final step of nitrogen gas only with water vapor at the lower temperature may be needed to cleanly remove the boron oxides without making any more.

In some embodiments, the pressure at each purification step may be raised so as to speed up the reaction times. In some embodiments, the pressure may be lowered. For example, the processes may be performed at 0.1 to 12 atmospheres and over 100 atmospheres. It should be appreciated by one of skill in the art that operating a pressurized system at elevated temperature may have additional safety and operational requirements and these can be avoided by operating at atmospheric pressure.

Figure 5:
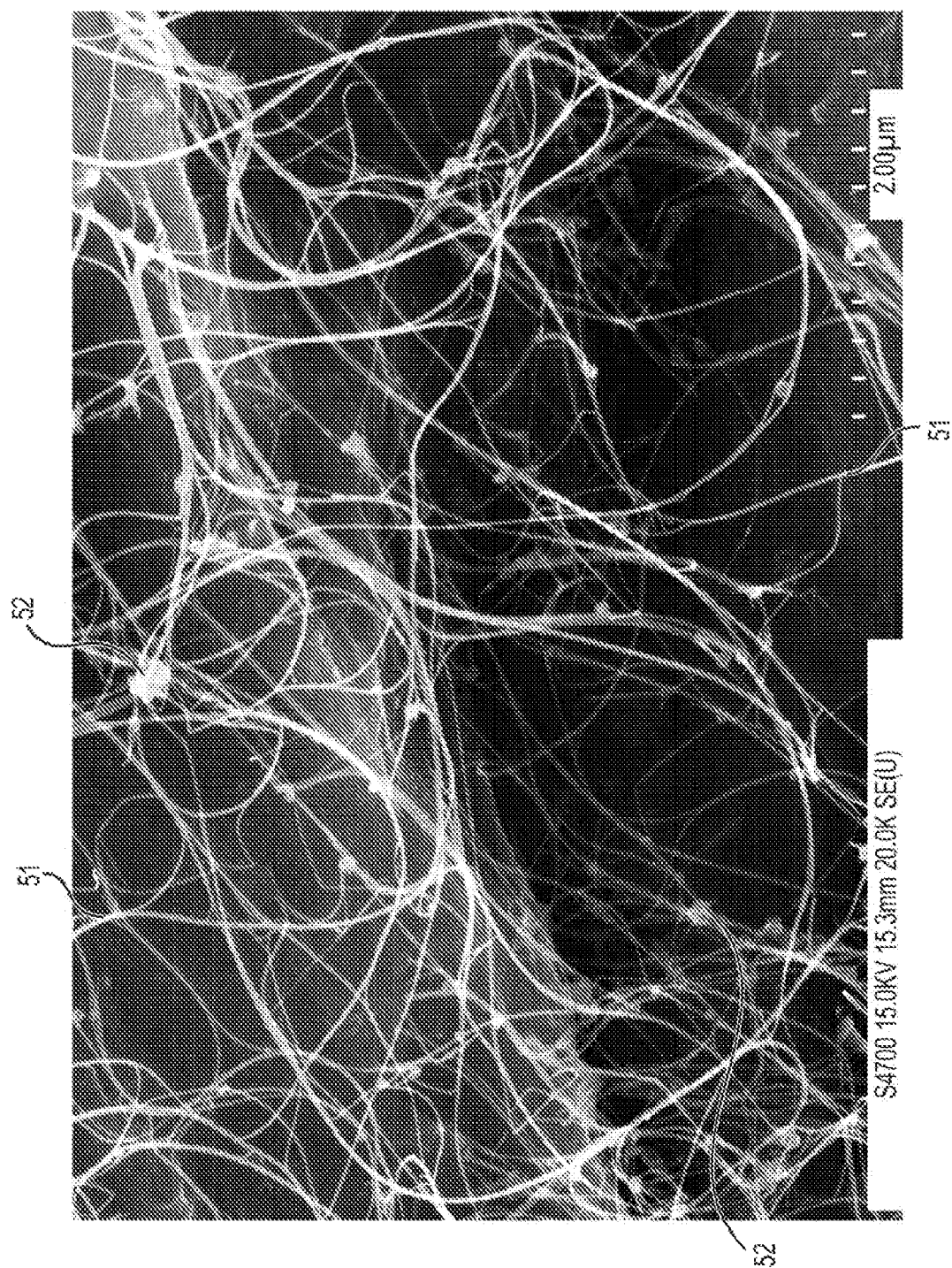
FIG. 5 illustrates a scanning electron microscope (SEM) image of purified BNNT material with the boron particles and a-BN removed and almost all of the h-BN nanocages and h-BN nanosheets removed.
Figure 6:
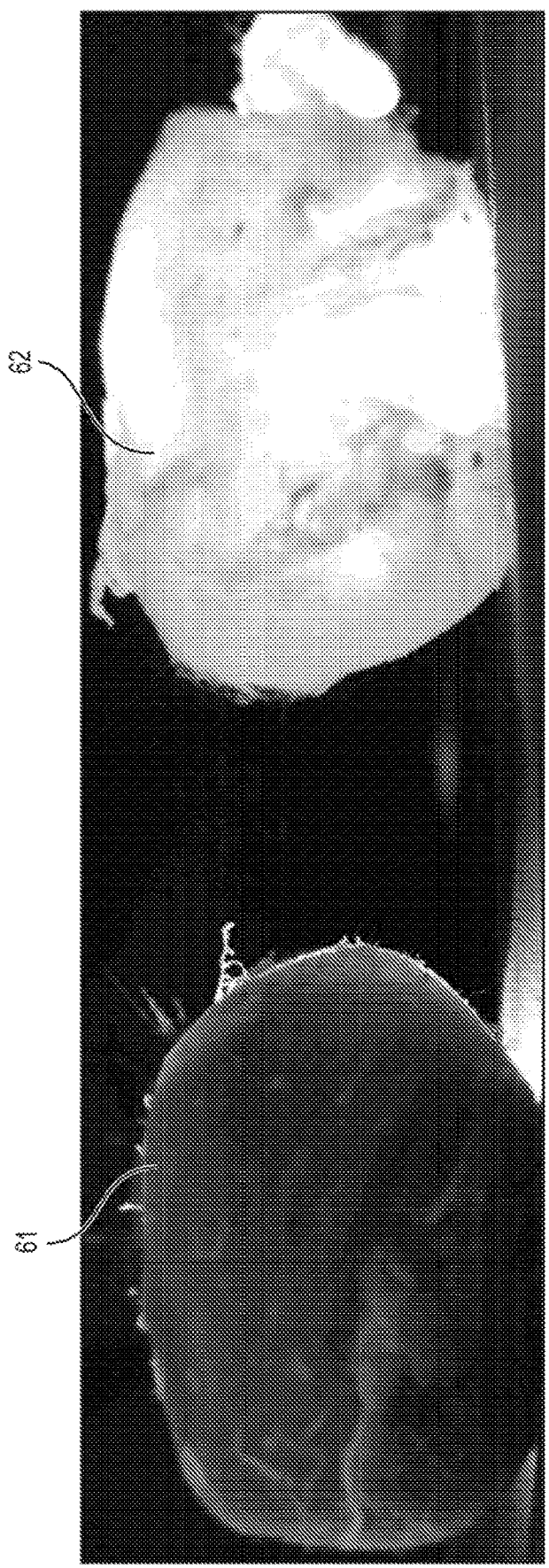
FIG. 6 shows an as-synthesized BNNT "puff ball" and a purified BNNT "puff ball.

FIG. 5 illustrates an SEM of purified BNNT material 51 with the impurities 52 (boron particles, a-BN, h-BN nanosheets, and h-BN nanocages) mostly removed. It should be appreciated that the degree of purification may vary from embodiment to embodiment. FIG. 6 shows an as-synthesized BNNT "puff ball" 61 and a purified BNNT "puff ball" 62. A purified as-synthesized BNNT "puff ball" 62 typically appears white, thick, and translucent blue if only a thin amount of material is present. This compares with the as-synthesized BNNT material "puff ball" 61 that is typically gray-white in color and is not very translucent. Of course, the appearance depends on the synthesis method. The difference between the light not passing through the as-synthesized BNNT "puff ball" 61 and the light making glow the purified BNNT "puff ball" is shown in FIG. 6. Depending on the character of the as-synthesized BNNT feedstock, yields of BNNT material (including BNNT, h-BN nanocages and h-BN nanosheets) of 50-80 percent are typically observed following boron removal and yields of BNNT material of 10-40 percent are typically observed following boron oxide removal when the processes herein are utilized. The yields may be further increased as the quality of the as-synthesized BNNT material is enhanced. Those of ordinary skill in the art should appreciate that higher yields may be obtained through optimization, both with respect to BNNT synthesis and BNNT purification.

Figure 7:
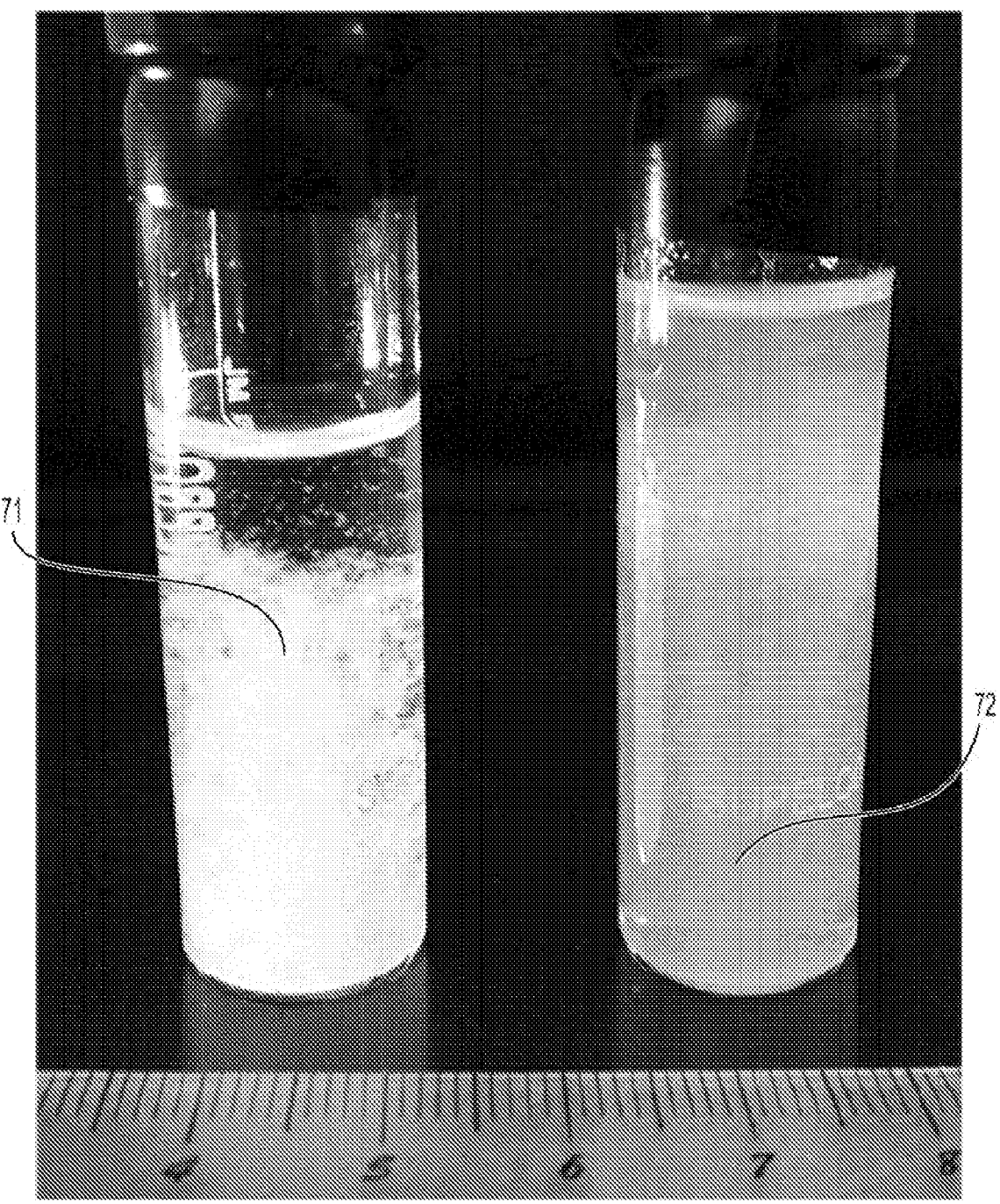
"
FIG. 7 shows partially purified BNNT material on the left and purified BNNT material on the right dispersed in isopropyl alcohol.

Purified BNNT material disperses well with light sonication in a variety of dispersants, such as, for example, short and long chained alcohols, aqueous acids, polymeric solutions, etc. Following dispersion, the purified BNNT may remain mostly dispersed after setting for days. In contrast, dispersion of the as-synthesized material typically is dominated by the presence of the boron particles and does not remain dispersed for days. FIG. 7 shows a container of "partially" purified BNNT material 71 (material that has gone through a boron purification stage) dispersed in isopropyl alcohol and slightly settling out, and a container of "fully" purified BNNT material 72 (material has gone through boron and boron nitride purification stages) dispersed in isopropyl alcohol. It can be seen that the "fully" purified BNNT material 72 remains well dispersed relative to "partially" purified BNNT material 71.

Figure 8:
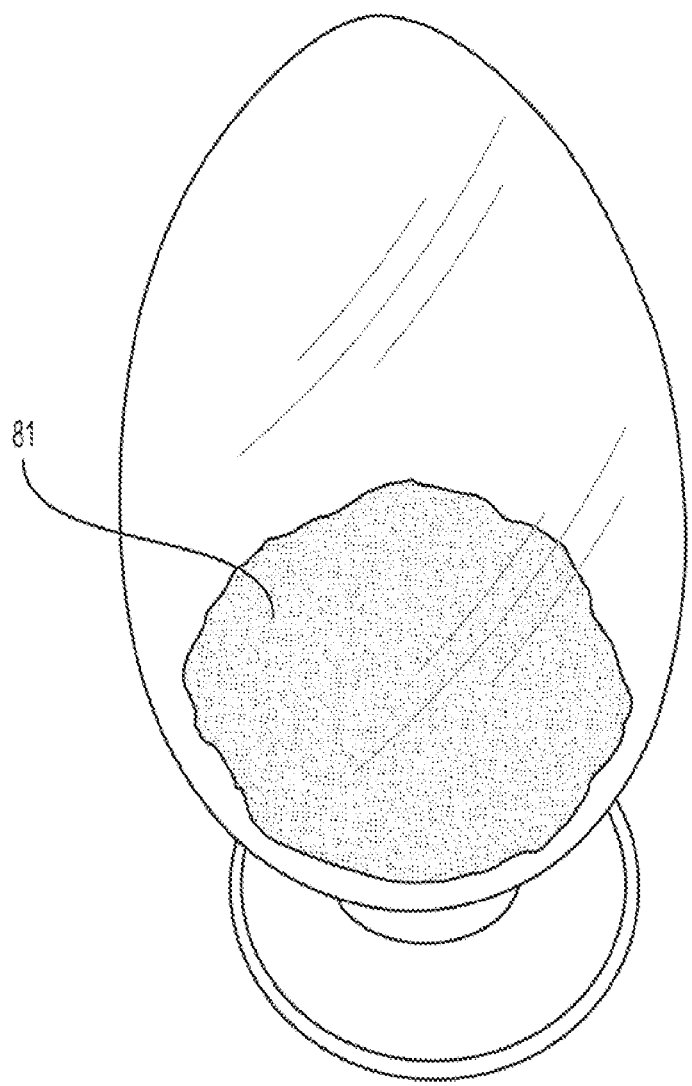
FIG. 8 illustrates partially purified BNNT material that has been freeze dried into a powder.
Figure 9:
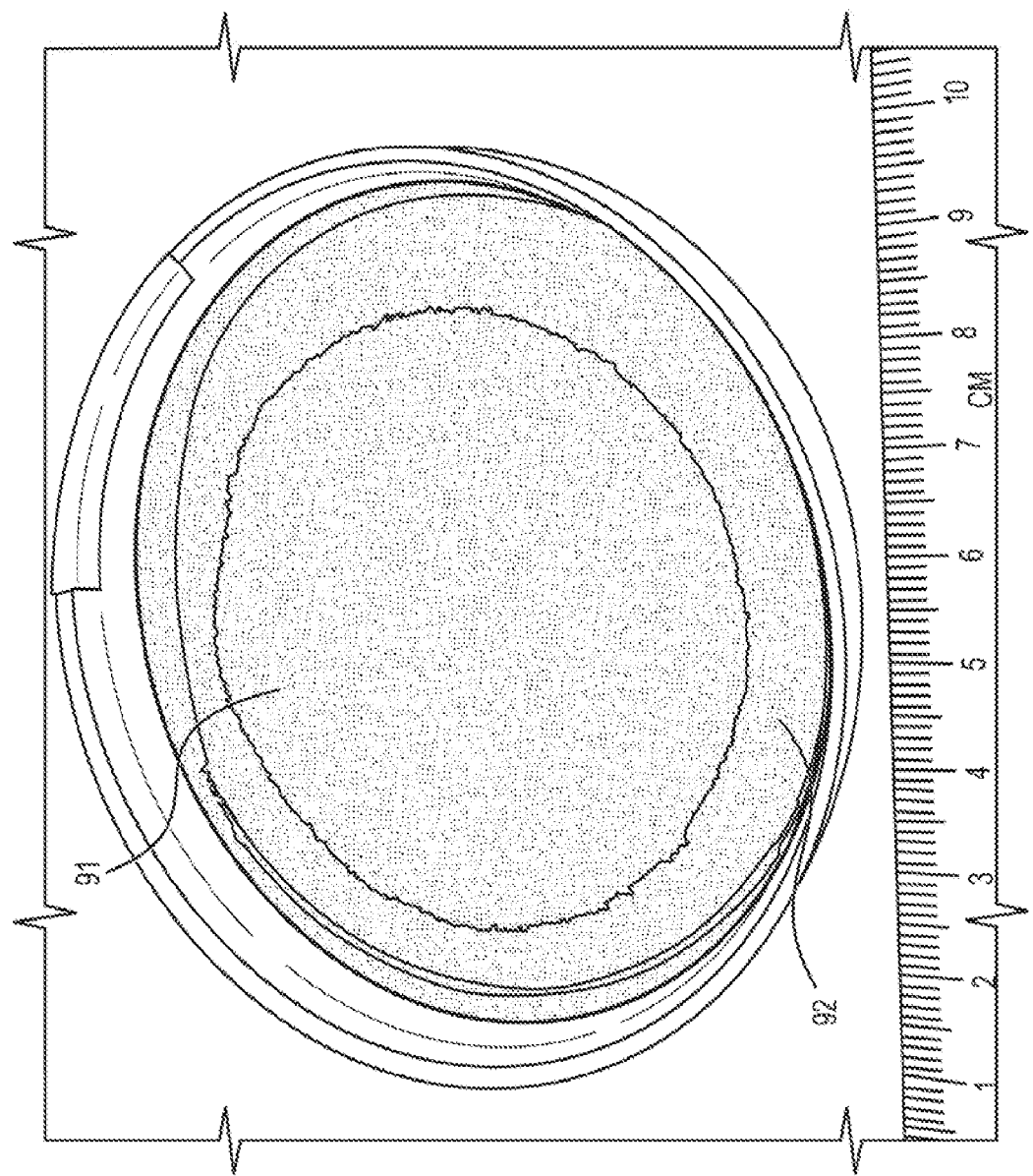
FIG. 9 illustrates partially purified BNNT collected as a mat.
Figure 10:
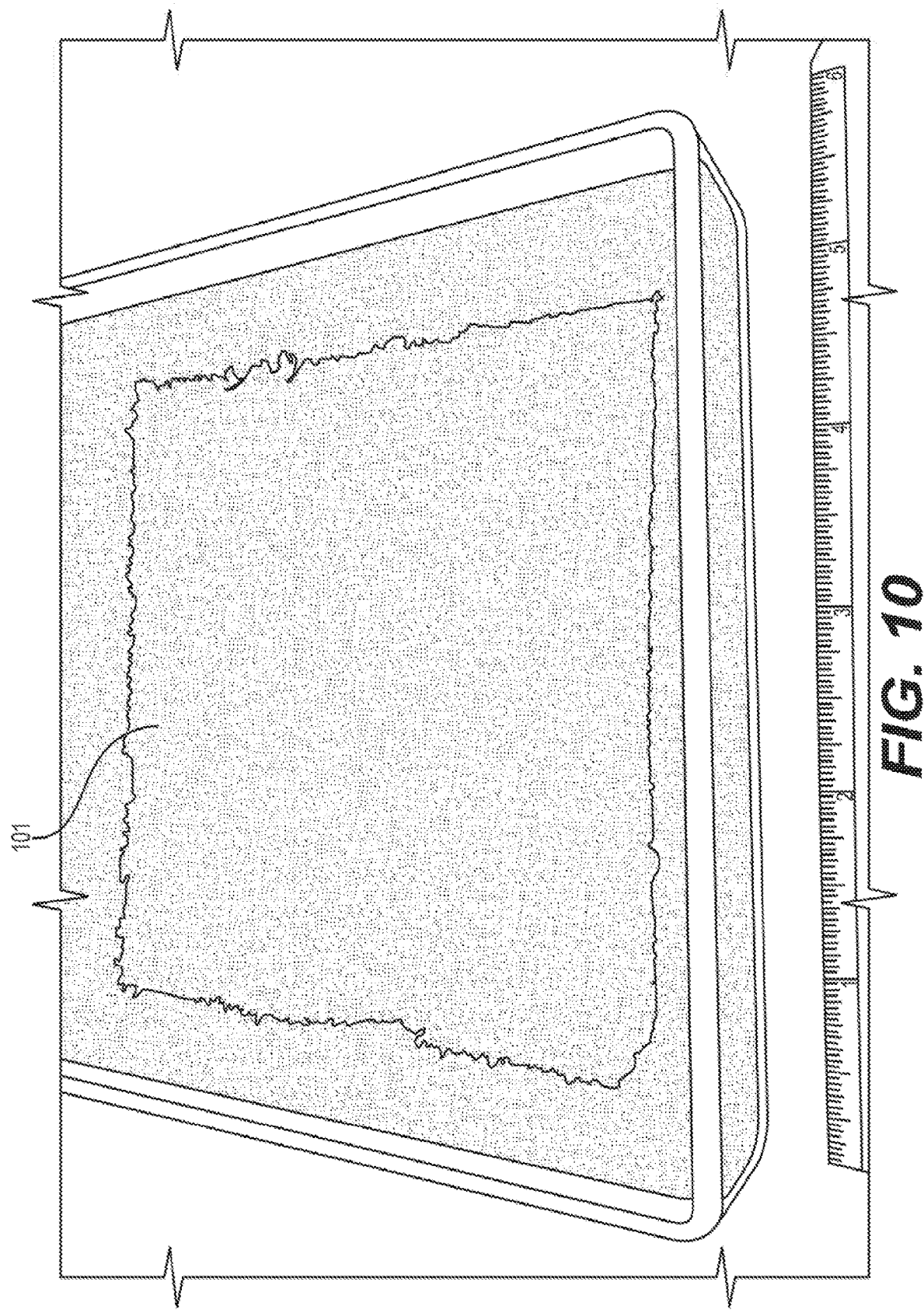
FIG. 10 illustrates nearly fully purified BNNT material made into a buckypaper.

In some embodiments, it may be desirable to produce partially purified BNNTs. For example, removing boron particles and the smaller particles of a-BN, the smaller h-BN nanocages, and h-BN nanosheets may be sufficient for certain BNNT applications. Shortening the heating time and/or lowering the temperature of some purification stages can accomplish this result. For example, rather than conducting the process of removing boron nitride compounds for about 6 hours at about 700° C., the stage may be truncated to about 1 hour at about 650° C. The stage for removing boron oxide may be performed if boron oxides are present in abundance, though it may also be truncated in some embodiments. In some embodiments, the yields of BNNTs, h-BN nanocages, and h-BN nanosheets may range from about 50 to about 70 percent. The resultant partially purified BNNT material may still disperse well in dispersants, though the settling time may be shortened to hours instead of days. FIG. 8 shows an example of as-synthesized BNNT material treated to being partially purified BNNT material that has been subsequently dispersed in a methyl alcohol water mixture and freeze-dried, producing a powder 81 that is readily mixable with other dry materials and liquids such as epoxies. FIG. 9 shows an example of BNNT powder that has been formed into a mat 91 over a filtration membrane 92. FIG. 10 shows a buckypaper 101 of partially purified material in which h-BN nanocages and h-BN nanosheets are present. As can be appreciated by one of skill in the art, there are varying degrees of purification. The purification process may be adjusted so as to maximize the yield of as-synthesized material going into a specific application.

Figure 11:
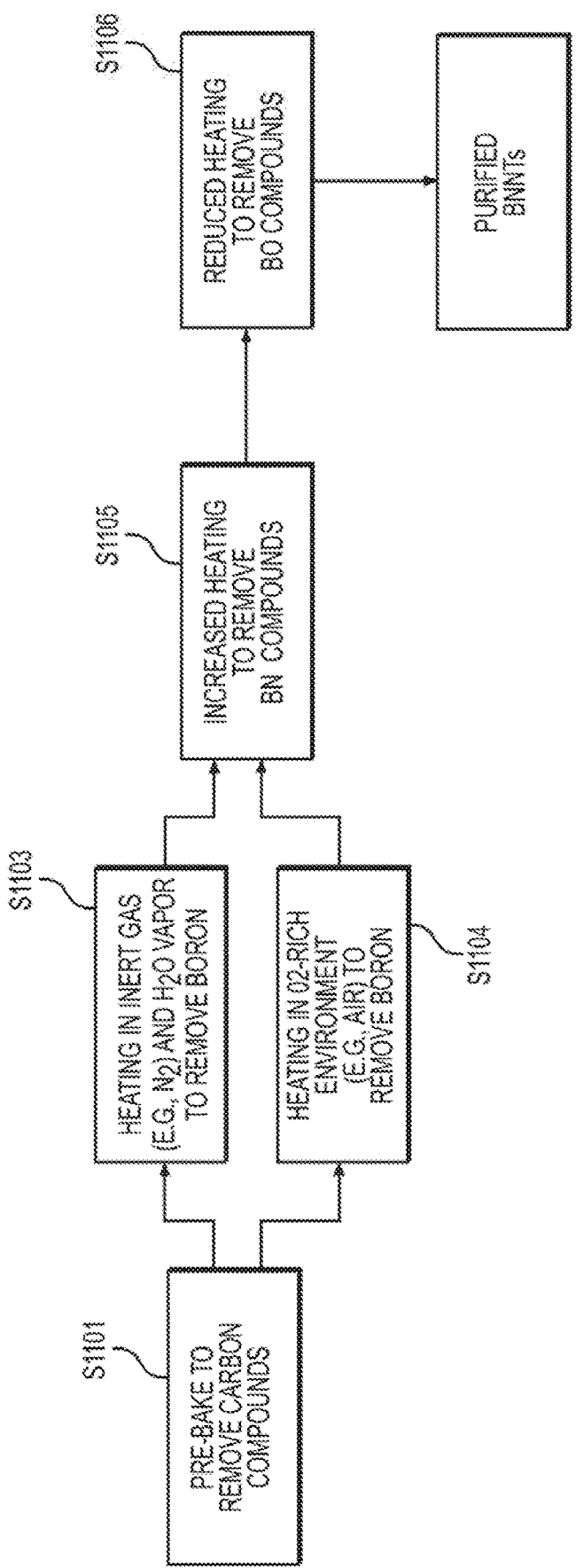
FIG. 11 illustrates an embodiment of a purification process according to the present approach.

FIG. 11 illustrates an embodiment of a purification process according to the present approach. As stated above, the specific operating parameters for each stage may vary, depending on the particular embodiment, the desired outcome, the starting as-synthesized BNNT material, and pre-purification handling of the BNNT material, and so on. Some embodiments may begin with an optional pre-baking stage S1101. In the pre-baking stage, the as-synthesized BNNT material (which, to avoid doubt, may have been further processed after synthesis) may be baked at a baking temperature for a baking duration to remove carbon or carbon-containing compounds. The pre-baking temperature may be, preferably, about 400-500° C., and the pre-baking duration may be about 0.5-3 hours. In some embodiments, the pre-baking may occur in an environment comprising ozone. Boron removal stage S1103 involves heating the BNNT material at a first temperature for a first duration in an inert gas with water vapor to remove boron. For removing boron impurities, the first temperature may preferably be about 500-650° C., and the as-synthesized material may remain in a chamber at the temperature for a given time, preferably about 0.16-12 hours. In some embodiments, the inert gas may include nitrogen, or it may consist of nitrogen, or it may consist essentially of nitrogen. In some embodiments, the hydrogen feedstock may be at least one of water vapor and hydrogen gas. In some embodiments, the amount of water vapor in the nitrogen gas may be controlled by using a dry nitrogen gas and bringing the dry nitrogen gas to saturated water vapor conditions at a temperature of 30-120° C., for example. Alternatively, an oxygen-based Boron removal stage S1104 may be used. The BNNT material may be heated to a first temperature for a first duration in an oxygen-rich environment to remove boron. The first temperature for the oxygen-rich stage may be, preferably, about 500-650° C., and the first duration may be, preferably, about 0.16-12 hours. Following boron removal, a BN removal stage S1105 may be performed. In stage S1105, the temperature may be increased to a second temperature, for a second duration, to remove BN compounds. For removing boron nitride impurities, the temperature may be raised to a second temperature, preferably about 650-800° C., and the second duration is preferably about 0.16-12 hours. Boron oxides may be removed at stage S1106, in which the temperature is reduced to a third temperature for a third duration. heating to remove BO compounds. For removing boron oxide impurities, the temperature may be lowered to a third temperature, preferably about 500-650° C., and the third duration is preferably about 0.16-12 hours. It should be appreciated that the purification process does not have to be performed in the order shown in FIG. 11. For example, step S1105 may be performed before step S1103. Also, those of ordinary skill in the art should appreciate that a stage may operate outside of the preferred operating ranges described herein, without departing from the present approach.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present approach may be embodied in other specific forms without departing from the spirit or essential characteristics thereof. The disclosed embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein. One of ordinary skill in the art should appreciate that numerous possibilities are available, and that the scope of the present approach is not limited by the embodiments described herein.

What is claimed is:

1. A process for purifying boron nitride nanotube (BNNT) material to remove impurities, the process comprising:
   heating the BNNT material at a first temperature for a first duration to remove boron impurities, wherein the first duration is about 0.16-12 hours;
   heating the BNNT material at a second temperature greater than the first temperature for a second duration to remove boron nitride impurities; and
   heating the BNNT material at a third temperature less than the second temperature for a third duration to remove boron oxide impurities.

2. The process of claim 1, wherein the first temperature is about 500-650° C.

3. The process of claim 1, wherein the BNNT material is heated at a first temperature for a first duration in the presence of an insert gas and a hydrogen feedstock.

4. The process of claim 1, wherein the second temperature is about 650-800° C.

5. The process of claim 1k wherein the second duration is about 1-12 hours.

6. The process of claim 1, wherein the third temperature is about 500-650° C.

7. The process of claim 1, wherein the third duration is about 0.16-1 hours.

8. The process of claim 1, wherein the first duration, the second duration, and the third duration are approximately the same amount of time.

9. The process of claim 1, further comprising pre-baking the BNNT material at a baking temperature for a baking duration to remove carbon impurities.

10. The process of claim 9, wherein the baking temperature is about 400-500° C., and the baking duration is about 0.5-3 hours.

11. The process of claim 9, wherein the pre-baking occurs before heating the BNNT material at a first temperature for a first duration.

12. The process of claim 9, wherein the BNNT material is pre-baked in an environment comprising ozone.

13. The process of claim 3, wherein the inert gas is nitrogen.

14. The process of claim 3, wherein the hydrogen feedstock is at least one of water vapor and hydrogen gas.

15. The process of claim 14, wherein the hydrogen feedstock comprises water vapor, and the amount of water vapor in the nitrogen gas is controlled by using a dry nitrogen gas and brining the dry nitrogen gas to saturated water vapor conditions at a temperature of about 30-100° C.

16. The process of claim 1, wherein the BNNT material is heated in an environment having a pressure of 0.1-12 atmospheres.

17. A process for purifying a BNNT material, the process comprising:
   heating the BNNT material at a first temperature of 500-650° C. for a first duration of 0.16-12 hours in an oxygen-rich environment to remove boron impurities;

heating the BNNT material at a second temperature of 650-800° C. for a second duration of 1-12 hours to remove boron nitride impurities; and heating the BNNT material at a third temperature of 500-650° C. for a third duration of 0.16-1 hours to remove boron oxide impurities.

18. The process of claim 17, further comprising pre-baking the BNNT material at a baking temperature of 400-500° C. for a baking duration of about 0.5-3 hours to remove carbon impurities.

19. The process of claim 18, wherein the BNNT material is pre-baked in an environment comprising ozone.

20. The process of claim 17, wherein the BNNT material is heated in an environment having a pressure of 0.1-12 atmospheres.

* * * * *